(12) United States Patent
Engelhardt

(10) Patent No.: US 6,636,352 B2
(45) Date of Patent: Oct. 21, 2003

(54) APPARATUS FOR OBJECTIVE CHANGING AND MICROSCOPE HAVING AN APPARATUS FOR OBJECTIVE CHANGING

(75) Inventor: Johann Engelhardt, Bad Schonborn (DE)

(73) Assignee: Leica Microsystems Heidelberg GmbH (DE)

( * ) Notice: Subject to any disclaimer, the term of this patent is extended or adjusted under 35 U.S.C. 154(b) by 0 days.

(21) Appl. No.: 09/681,918

(22) Filed: Jun. 26, 2001

(65) Prior Publication Data

US 2002/0001126 A1 Jan. 3, 2002

(30) Foreign Application Priority Data

Jun. 29, 2000 (DE) .......................................... 100 31 720

(51) Int. Cl.[7] .......................... G02B 21/00; G02B 21/26
(52) U.S. Cl. ...................... 359/380; 359/368; 359/391; 359/821
(58) Field of Search .......................... 359/368, 329–380, 359/391–393, 821

(56) References Cited

U.S. PATENT DOCUMENTS

| | | | | |
|---|---|---|---|---|
| 1,818,974 A | * | 8/1931 | Engelmann | |
| 3,488,109 A | * | 1/1970 | Sperlich | |
| 3,631,775 A | * | 1/1972 | Tidd | |
| 5,535,052 A | * | 7/1996 | Jorgen | |
| 5,576,897 A | * | 11/1996 | Kuo | |
| 6,268,958 B1 | * | 7/2001 | Furuhashi | |

FOREIGN PATENT DOCUMENTS

| | | |
|---|---|---|
| DE | 29 22 212 A1 | 12/1979 |
| EP | 0 124 980 A1 | 3/1984 |

* cited by examiner

*Primary Examiner*—Thong Nguyen
(74) *Attorney, Agent, or Firm*—Brown Rudnick Berlack Israels LLP

(57) ABSTRACT

The apparatus for objective changing comprises an inventory of at least one objective (5) which defines a longitudinal axis (6). The objective change between an objective storage position (22) and a reference objective position (5a) is made possible by the apparatus, and the reference objective position (5a) lies within an optical beam path that defines an optical axis (3). A retaining element defines the reference objective position (5a), and during the objective change, the objective (5) with its longitudinal axis (6) is movable, in the vicinity of the retaining element (26), substantially coaxially with the optical axis (3). The objective change is accomplished along a guide rail (17).

15 Claims, 4 Drawing Sheets

APPARATUS FOR OBJECTIVE CHANGING AND MICROSCOPE HAVING AN APPARATUS FOR OBJECTIVE CHANGING

CROSS REFERENCE TO RELATED APPLICATIONS

This invention claims priority of the German filed patent application DE 100 31 720.0 which is incorporated by reference herein.

BACKGROUND OF INVENTION

The invention concerns an apparatus for objective changing. In addition, the invention also concerns a microscope having an apparatus for objective changing. The microscope can be configured as a scanning microscope or also as a confocal microscope.

Microscopes have been known from the existing art for some time. Objective changing is generally performed by means of a revolving nosepiece.

European Patent Application EP-A-0 124 980 discloses an inverted microscope in which the revolving nosepiece sits below the specimen that is to be observed. The advantage of the inverted microscope design is that the revolving nosepiece does not interfere with the space above or next to the specimen as the objective is changed. A certain movement space is needed to pivot in the objectives arranged on the revolving nosepiece. The inverted microscope has the disadvantage that observation must always take place through a glass plate as a specimen is being observed and manipulated. In addition, it is more difficult to use incident illumination because the immersion liquid often penetrates into the optical system.

German Patent Application DE-A-29 22 212 discloses a microscope having an associated micromanipulator. The tip of the micromanipulator touches the specimen being examined, and at high magnification is located very close to the objective. Considering that not just one manipulator but several of them act on the specimen being examined, and furthermore from both sides, it is easy to imagine that if objective changing on an upright microscope is performed carelessly, the manipulators can be damaged. To prevent damage, the manipulators must be removed for the objective change, and reoriented after the change. This is time-consuming and inefficient.

German Patent Application DE-A-198 34 829 discloses a microscope that possesses a revolving nosepiece for changing the objectives. The revolving nosepiece is configured in such a way that the individual objectives mounted on the revolving nosepiece are arranged with their optical axes perpendicular to the rotation axis of the nosepiece. The rotation axis of the revolving nosepiece is at least partially a component of the optical beam path. In the region of the specimen, the objective being pivoted in or out requires sufficient space in the X-Z plane. Arrangements for specimen manipulation cannot be provided in this region, since the risk of damage is too great.

SUMMARY OF INVENTION

It is the object of the invention to create an apparatus for objective changing, which requires only a small space. A further intention is that the adjustment or alignment of the additional equipment items is not necessary.

The object is achieved by an apparatus for objective changing which comprises: an inventory of at least one objective which defines a longitudinal axis, an objective storage position in said inventory and a reference objective position defined by a retaining element wherein during the objective change the objective with its longitudinal axis is movable in the vicinity of the retaining element substantially coaxially with an optical axis defined by the objective in the reference objective position.

It is the object of the invention to create an objective changing device that makes available, in the region of a specimen being observed, sufficient space that damage to additional equipment items is avoided. A further intention is that the adjustment or alignment of the additional equipment items is not be modified during objective changing.

The stated object is achieved by an apparatus which comprises; an inventory of at least one objective wherein the objective defines a longitudinal axis, an objective storage position, a reference objective position wherein the objective change takes place between the objective storage position and the reference objective position, an optical axis is defined by the objective in the reference objective position, and a retaining element defines the reference objective position; wherein during the objective change the objective with its longitudinal axis is movable, in the vicinity of the retaining element, substantially coaxially with the optical axis.

A further object of the invention is to create a microscope in which the objective change is performed in such a way as to influence or limit the region around the specimen being examined as little as possible. Damage to manipulators resulting from the objective change is to be avoided.

The stated objective is achieved by a microscope comprising: an objective changing device, an inventory of at least one objective wherein the objective defines a longitudinal axis, an objective storage position in said inventory and a reference objective position defined by a retaining element wherein during the objective change the objective with its longitudinal axis is movable in the vicinity of the retaining element substantially coaxially with an optical axis defined by the objective in the reference objective position.

An advantage of the invention is that during the objective change, there is almost no influence on the space around an objective located in the reference objective position. The manipulators acting on a specimen (microtools, micropipettes, microelectrodes, microneedles) need to be adjusted and aligned with the specimen only once. The objective change into the reference objective position, which is defined by a retaining element, is accomplished in such a way that during the objective change, the longitudinal axis of the objective is movable, in the vicinity of the retaining element, substantially coaxially with the optical axis of the objective.

Since a conventional revolving nosepiece requires considerable space around the reference objective position because of the pivoting motion into the next reference objective position, the risk of damage to the manipulators exists. The apparatus according to the present invention has the further advantage that little space laterally around the reference objective position is required during the objective change. The manipulators no longer need to be removed from the specimen during the objective change and then realigned. The complex, time-consuming, and productivity-reducing alignment process can be eliminated by the invention.

A microscope that uses the apparatus according to the present invention is configured in such a way that the stand has configured in it at least one opening through which at least one objective is movable from the objective storage position into the reference objective position. It is further advantageous that the microscope, in the stand region of the objective-side beam path (the microscope head), is insignificantly wider than the diameter of the objective. Sufficient room is thus created for arrangement of the numerous manipulators acting on the specimen. The overall result of this is that the micromanipulators acting on the specimen being examined remain in their predetermined positions during the objective change.

In addition, the microscope can be configured as a scanning microscope or as a confocal scanning microscope.

BRIEF DESCRIPTION OF DRAWINGS

The subject matter of the invention is schematically depicted in the drawings and will be described below with reference to the Figures, in which.

DETAILED DESCRIPTION

Figure 1:
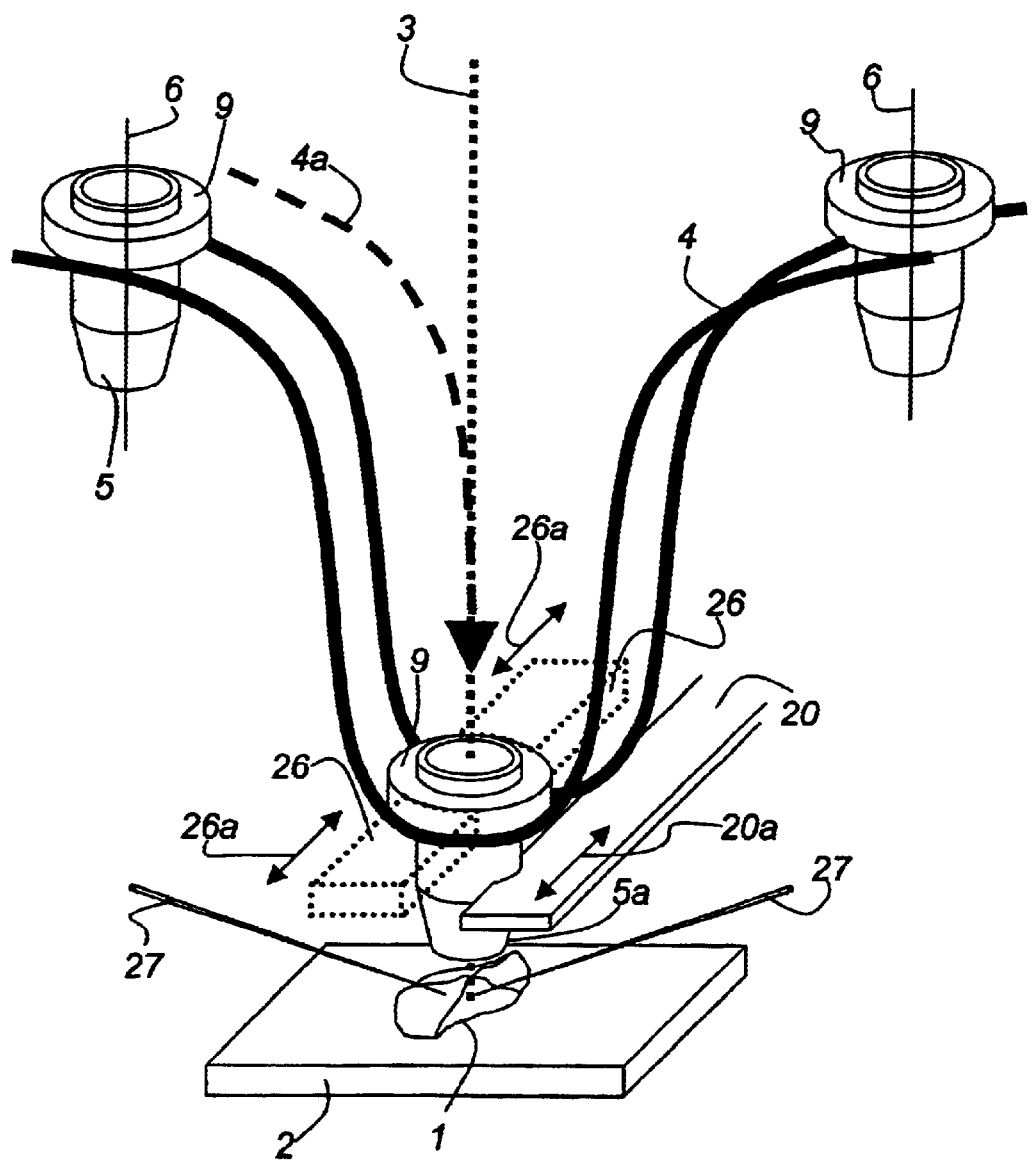
FIG. 1 shows an exemplary embodiment in which the objectives to be changed are movable along a curve.
Figure 2:
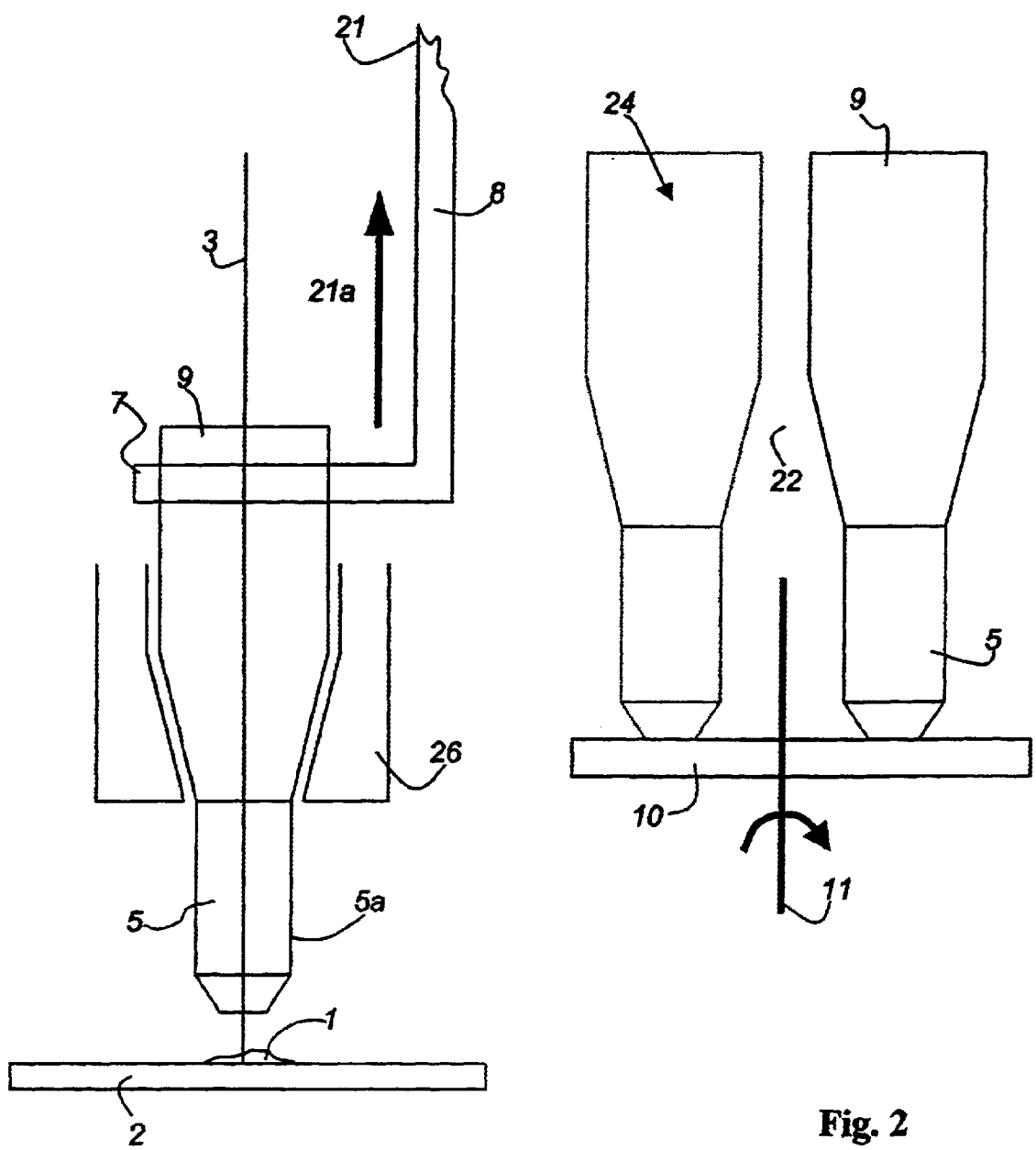
FIG. 2 shows an exemplary embodiment in which the objectives are brought into the reference objective position by means of a robot arm.

FIG. 1 shows the changing of at least one objective 5 into a reference objective position 5a. Each objective 5 defines a longitudinal axis 6 which, when objective 5 is in reference objective position 5a, coincides with an optical axis 3 defined by the microscope. The configuration of a microscope need not be discussed here in more detail, since it should be sufficiently familiar to those skilled in the art. The description below of the invention refers to a microscope, but this is not to be understood as a limitation of the invention. The various embodiments of the apparatuses for objective changing can, of course, also be used with other systems that are physically confined in terms of freedom of movement around the objective. In reference objective position 5a, objectives 5 are arranged in such a way that they are located opposite a specimen 1 arranged on a specimen stage or a slide 2. In this exemplary embodiment, objectives 5 are transferred by way of a curve 4 from an objective storage position (not depicted into reference objective position 5a. As illustrated in FIG. 1 and FIG. 2, the objective storage position is elevated relative to the reference objective position.

One possible movement direction is indicated by an arrow 4a. Curve 4 can be formed, for example, from a metal strip with which objectives 5, attachable thereto, are brought into reference objective position 5a. The metal strip is guided appropriately so that it follows the shape of the curve. Curve 4 can also be referred to as a curve element. Reference objective position 5a is defined by a stop 20 against which objective 5 makes contact when reference objective position 5a is reached. As indicated by arrow 20a, stop 20 is movable in the direction of arrow 20a. This ensures unimpeded movement of objectives 5 from the objective storage position into reference objective position 5a. Objective 5 is equipped with a guide element 9 that on the one hand serves as a transport guide and on the other hand coacts with a two-part retaining element 26. Each part of retaining element 26 is movable, in accordance with arrows 26a depicted in FIG. 1, in order to make possible unimpeded movement of objective 5 into reference objective position 5a. When objective 5 is in reference objective position 5a, the parts of retaining element 26 move toward one another and immobilize objective 5 in reference objective position 5a. In reference objective position 5a, optical axis 3 is coaxial with longitudinal axis 6 of objective 5. Retaining element 26 and stop 20 are arranged or configured in such a way that they do not disturb the positioning and/or alignment of micromanipulators 27. Micromanipulators 27 are used to influence specimen 1 mechanically, electrically, or chemically.

The exemplary embodiment depicted in FIG. 2 depicts a robot arm 21 with which objectives 5 are brought from objective storage position 22 into reference objective position 5a. In the exemplary embodiment depicted here, the objectives are arranged in their objective storage position 22 on a rotary magazine 10. Rotary magazine 10 is rotatable about a rotation axis 11 so that the objectives can be moved into a removal and delivery position 24. Objective 5 itself is equipped with a guide element 9 that coacts with a retaining element 26 in order thereby to define and/or immobilize objective 5 in reference position 5a. Robot arm 21 comprises a gripper arm 7 and a pivot arm 8. For transporting objectives 5 from objective storage position 22 into reference objective position 5a, the gripper arm grasps guide element 9 attached to objective 5. Objective 5, grasped in this fashion, can be brought by means of pivot arm 8 into the vicinity of reference objective position 5a. Gripper arm 7 can then release objective 5 so that it is correspondingly positioned, by guide element 9 and retaining element 26, with respect to optical axis 3. It is also conceivable for gripper arm 7 of robot arm 21 to serve simultaneously as an objective immobilizing system which positions objective 5 in optical axis 3 in corresponding fashion. Arrow 21a shows the direction of motion of robot arm 21 upon the removal of objective 5 from retaining element 26.

Figure 3:
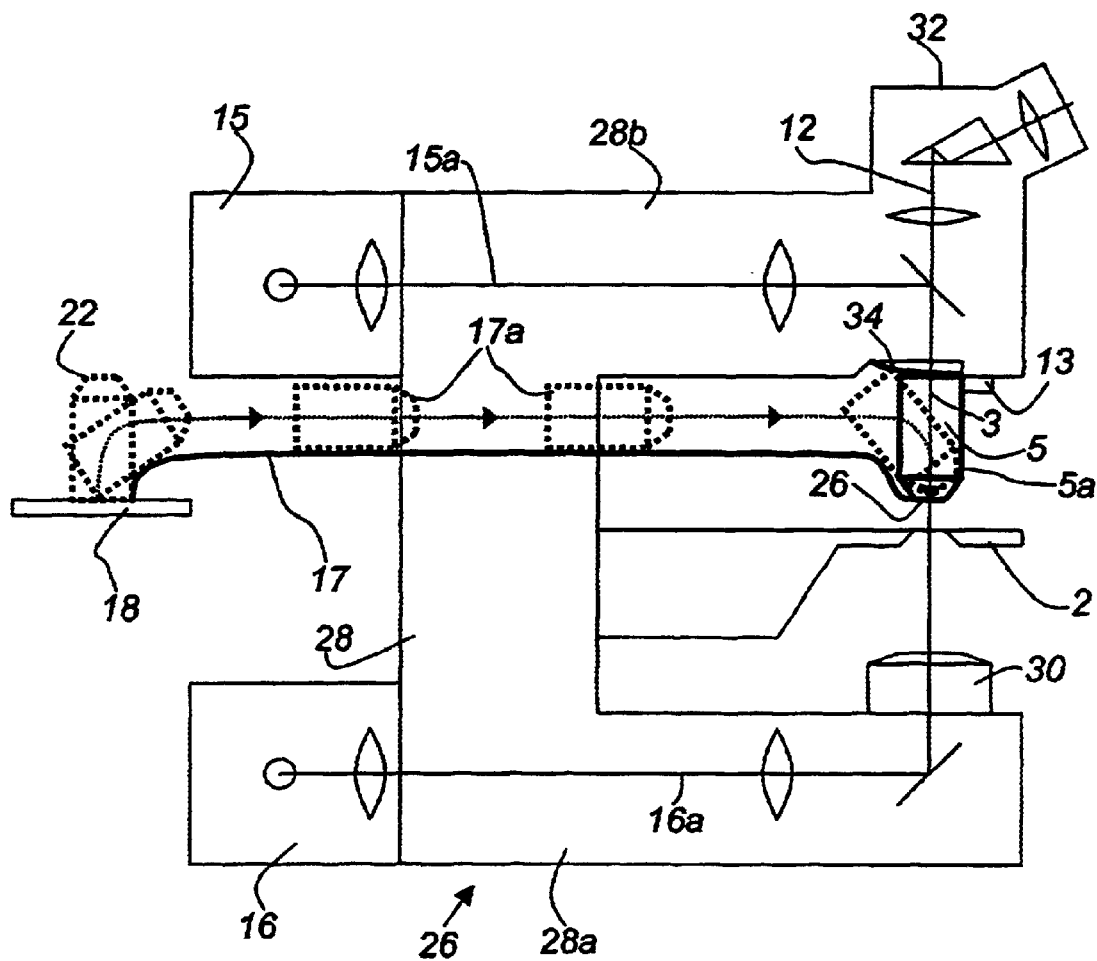
FIG. 3 shows a side view of a third exemplary embodiment in which the objectives are moved into the beam path of the microscope by a linear motion.

FIG. 3 shows a further embodiment of the invention. The apparatus for objective changing is depicted together with a microscope. Microscope comprises a stand 28 that comprises a foot part 28a and a microscope head 28b. A transmitted illumination system 16 is provided on foot part 28a, and an incident illumination system 15 on microscope head 28b. The specimen (not depicted) can be placed onto specimen stage 2. Light from transmitted illumination system 16 is directed via a condenser 30 onto the specimen, and defines a transmitted beam path 16a. Light from incident illumination system 15 passes through objective 5 onto the specimen and defines an incident beam path 15a. Provided on microscope head 28b is a tube 32 which defines an observation beam path 12 that coincides with optical axis 3 of objective 5. An apparatus for conveying at least one objective 5 from an objective storage position 22 into a reference objective position 5a is provided. In this exemplary embodiment, objective storage position 22 is determined by a magazine 18. Magazine 18 can receive several objectives. The conveying apparatus comprises a guide rail 17 on which objective 5 that is to be used is movable to or from reference objective position 5a. Objective 5 is depicted with dashed lines during the individual transport phases 17a. When the desired objective 5 is located in the removal position, it is placed by suitable mechanical means (not depicted) onto guide rail 17. On guide rail 17, objective 5 is then transported into reference objective position 5a. Reference objective position 5a is delimited by a stop 13. Provided on microscope head 28b in the vicinity of the reference objective position is a spring element 34 that pushes objective 5 into a retaining element 26 for immobilization in optical axis 3. Guide rail 17 can be arranged in such a way that it passes through stand 28. Corresponding openings or cutouts (not depicted) that allow sufficient space for the transportation of objectives 5 are provided for the purpose in stand 28.

Figure 4:
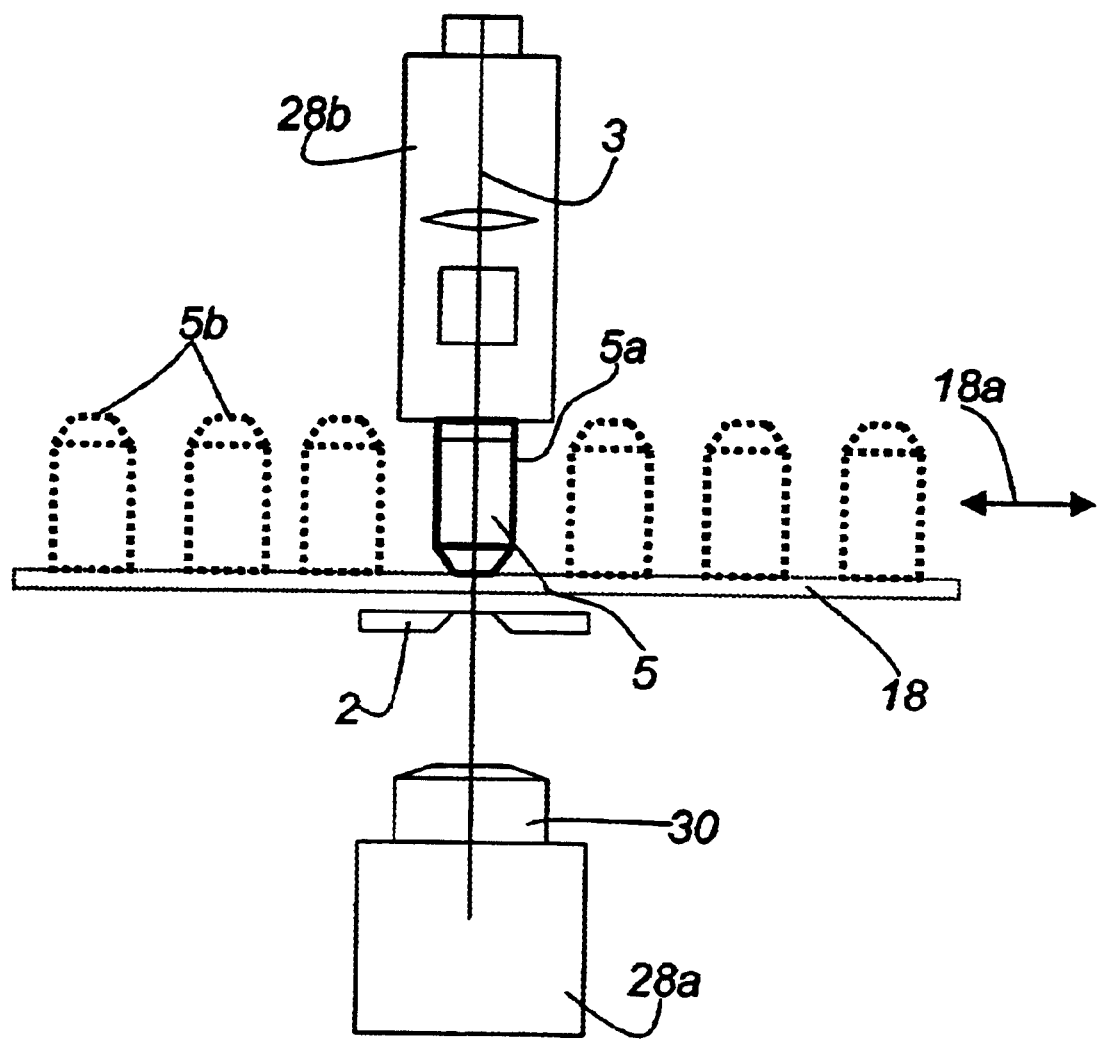
FIG. 4 shows another view of FIG. 3 showing the arrangement of the objective inventory with respect to the microscope.

FIG. 4 shows a frontal view of the microscope, depicting (for reasons of clarity) only the essential parts. Microscope head 28b and foot part 28a represent the foreground of the depiction. Magazine 18 is in the background and consequently is depicted with dashed lines. Objective 5, located in reference objective position 5a, defines optical axis 3, which continues in microscope head 28b and in condenser 30. Reference objective position 5a is provided above specimen stage 2. Magazine 18 is movable linearly and at right angles to optical axis 3 (indicated by double arrow 18a) in order to bring the objectives desired for the examination into a position such that they can be transported by guide rail 17 (see FIG. 3) into reference objective position 5a. Objectives 5b in magazine 18 are depicted with thick dashed lines. The position of objectives 5b in magazine 18 is intended to depict only one example of a possible storage situation, and is in no way to be construed as a limitation.

Common to all the exemplary embodiments depicted in FIGS. 1 through 3 is the fact that a retaining element defines the reference objective position or immobilizes objective 5 in reference objective position 5a. In addition, during the objective change, longitudinal axis 6 of objective 5 moves, in the vicinity of retaining element 26, substantially coaxially with optical axis 3. The physical starting position from which objectives 5 are brought into reference objective position 5a is immaterial in this context.

The invention has been described with reference to a particular embodiment. It is nevertheless self-evident that changes and modifications can be made without thereby leaving the range of protection of the claims recited hereinafter.

What is claimed is:

1. In a microscope defining an optical axis and comprising an apparatus for changing one or more objectives, the apparatus comprising:
    an inventory of at least one objective having a longitudinal axis;
    an objective storage position and a reference objective position, the reference objective position being defined by a retaining element, the objective storage position being elevated relative to the reference objective position;
    the retaining element being disposed in the apparatus to receive at least one objective in the reference objective position, the longitudinal axis of at least one objective in the reference objective position received by the retaining element coinciding with the optical axis of the microscope; and
    mechanical means for moving at least one objective of the inventory from the objective storage position to the reference objective position.

2. The apparatus of claim 1, farther comprising a stop element intended to define the reference objective position in combination with the retaining element.

3. The apparatus of claim 1, wherein the mechanical means comprise a robot arm.

4. The apparatus of claim 1, wherein at least one objective moved from the objective storage position to the reference objective position travels along a U-shaped path.

5. The apparatus of claim 4, wherein at least one objective comprises a guide element serving to transport at least one objective along the U-shaped path.

6. The apparatus of claim 1, wherein the retaining element comprises at least two parts.

7. A microscope for examining a specimen, the microscope defining an optical axis, the microscope comprising:
    an objective changing device comprising:
        an inventory of at least one objective having a longitudinal axis; an objective storage position and a reference objective position, the reference objective position being defined by a retaining element, the objective storage position being elevated relative to the reference objective position;
        the retaining element being disposed in the apparatus to receive at least one objective in the reference objective position, the longitudinal axis of at least one objective in the reference objective position received by the retaining element coinciding with the optical axis of the microscope; and
        mechanical means for moving at least one objective of the inventory from the objective storage position to the reference objective position;
    a specimen stage for holding thc specimen, the specimen stage being disposed along the optical axis; and
    means for manipulating the specimen during the examination of the specimen.

8. The microscope of claim 7, wherein the means for manipulation the specimen comprise microelectrodes, micro needles or micropipettes.

9. The microscope of claim 7, wherein the specimen stage is a slide.

10. The microscope of claim 7, wherein the mechanical means comprise a robot arm.

11. The microscope of claim 7, wherein at least one objective moved from the objective storage position to the reference objective position travels along a U-shaped path.

12. The microscope of claim 11, wherein at least one objective comprises a guide element serving to transport at least one objective along the U-shaped path.

13. The microscope of claim 7, wherein the retaining element comprises at least two parts.

14. The microscope of claim 7, where in the microscope can be a scanning or a confocal microscope.

15. The microscope of claim 7, wherein a position of the manipulation means does not change during the movement of at least one objective from the objective storage position to the reference objective position.

* * * * *